US012505146B1

(12) United States Patent
Henderson

(10) Patent No.: US 12,505,146 B1
(45) Date of Patent: Dec. 23, 2025

(54) APPARATUS AND METHOD FOR TRAINING A MODEL TO DETECT TEMPORALLY STRUCTURED INFORMATION WITHIN AN UNSTRUCTURED DATASET

(71) Applicant: Healsgood Artificial Intelligence, Dubai (AE)

(72) Inventor: Jack Robert Muir Henderson, London (GB)

(73) Assignee: Healsgood Artificial Intelligence Developing Services L.L.C, Dubai (AE)

( * ) Notice: Subject to any disclaimer, the term of this patent is extended or adjusted under 35 U.S.C. 154(b) by 0 days.

(21) Appl. No.: 18/933,800

(22) Filed: Oct. 31, 2024

(51) Int. Cl.
*G06F 16/00* (2019.01)
*G06F 16/34* (2019.01)
*G06F 16/355* (2025.01)
*G06F 16/38* (2019.01)

(52) U.S. Cl.
CPC ............ *G06F 16/355* (2019.01); *G06F 16/34* (2019.01); *G06F 16/38* (2019.01)

(58) Field of Classification Search
None
See application file for complete search history.

(56) References Cited

U.S. PATENT DOCUMENTS

| | | |
|---|---|---|
| 8,006,130 B2 | 8/2011 | Kanso et al. |
| 11,176,940 B1 * | 11/2021 | Zhong ..................... G06F 3/167 |
| 11,960,515 B1 * | 4/2024 | Pallakonda ............. G06F 40/30 |
| 11,983,494 B1 * | 5/2024 | Watkins ................. G06F 40/279 |
| 11,995,120 B1 * | 5/2024 | Kirke ..................... G06F 16/538 |
| 12,028,180 B1 * | 7/2024 | Varma .................. H04L 12/1831 |
| 12,045,700 B1 * | 7/2024 | Kirke ...................... G06N 3/047 |
| 12,056,443 B1 * | 8/2024 | Jaiswal ................. G06F 40/169 |
| 12,073,930 B1 * | 8/2024 | Alperin .................. G16H 10/60 |
| 12,086,530 B1 * | 9/2024 | Smith ..................... G06F 40/10 |
| 12,100,393 B1 * | 9/2024 | Smith .................... G06F 40/20 |
| 12,124,966 B1 * | 10/2024 | Alperin .................. G06F 40/30 |

(Continued)

OTHER PUBLICATIONS

Yoo, Byunghee, et al. "Harnessing generative pre-trained transformers for construction accident prediction with saliency visualization." (Jan. 12, 2024) Applied Sciences 14.2: 664. (Year: 2024).*

*Primary Examiner* — Polina G Peach
(74) *Attorney, Agent, or Firm* — Caldwell Intellectual Property Law

(57) ABSTRACT

An apparatus and method for automatically managing candidate's availability using language processing. The apparatus includes at least a processor and a memory communicatively connected to the at least a processor. The memory instructs the processor to generate, using a large language model, a first communication, wherein the first communication comprises a first query, transmit the first communication, using a first communication channel of a plurality of communication channels, receive a first response, wherein the first response comprises temporally structured information associated with the first communication, generate, using the large language model, a follow-up communication, transmit the follow-up communication, using at least a communication channel of the plurality of communication channels, receive a follow-up response, display, using a client device, the first communication and the follow-up communication.

20 Claims, 7 Drawing Sheets

(56) References Cited

U.S. PATENT DOCUMENTS

| | | | | |
|---|---|---|---|---|
| 12,153,634 B1* | 11/2024 | Smith | | G06F 16/906 |
| 12,154,245 B1* | 11/2024 | Barve | | G06T 15/205 |
| 12,154,273 B1* | 11/2024 | Upadhyay | | G06T 7/0012 |
| 12,165,774 B1* | 12/2024 | Agarwal | | A61B 5/361 |
| 12,182,178 B1* | 12/2024 | Smith | | G06F 16/2428 |
| 12,182,179 B1* | 12/2024 | Aravamudan | | G06F 40/20 |
| 12,182,311 B1* | 12/2024 | Ardhanari | | G06F 21/6254 |
| 12,190,331 B1* | 1/2025 | Russo | | G06N 20/00 |
| 12,198,028 B1* | 1/2025 | Alperin | | G06F 16/909 |
| 12,200,167 B1* | 1/2025 | Mecca | | H04M 3/42068 |
| 12,202,183 B1* | 1/2025 | Usui | | B29C 45/7693 |
| 12,211,598 B1* | 1/2025 | Aravamudan | | G16H 10/20 |
| 12,217,361 B1* | 2/2025 | Chunduru | | G06T 17/00 |
| 12,229,962 B1* | 2/2025 | Aravamudan | | G06T 7/0016 |
| 12,242,945 B1* | 3/2025 | Everest | | G06N 20/00 |
| 12,254,005 B1* | 3/2025 | Sinha | | G16H 10/60 |
| 12,259,864 B1* | 3/2025 | Aravamudan | | G16H 10/60 |
| 12,266,107 B1* | 4/2025 | Vaidya | | G16H 10/60 |
| 2006/0200478 A1* | 9/2006 | Pasztor | | G06F 40/205 |
| 2010/0318398 A1* | 12/2010 | Brun | | G06Q 10/109 705/7.18 |
| 2012/0123958 A1 | 5/2012 | Green et al. | | |
| 2014/0195621 A1* | 7/2014 | Rao DV | | H04L 12/1827 709/206 |
| 2019/0114593 A1* | 4/2019 | Champaneria | | G06F 16/3326 |
| 2019/0182335 A1* | 6/2019 | Chen | | H04L 67/141 |
| 2019/0333022 A1* | 10/2019 | Lee | | G06Q 10/1095 |
| 2019/0392395 A1* | 12/2019 | Valliani | | H04M 3/565 |
| 2020/0258001 A1* | 8/2020 | Peterson | | H04L 67/54 |
| 2021/0201144 A1* | 7/2021 | Jonnalagadda | | G06N 3/08 |
| 2022/0308718 A1* | 9/2022 | Klein | | G10L 15/08 |
| 2023/0153546 A1* | 5/2023 | Peleg | | G06F 40/289 704/9 |
| 2023/0214782 A1* | 7/2023 | Ram | | G06F 40/40 704/9 |
| 2023/0401540 A1* | 12/2023 | Bhatia | | G06Q 10/1095 |
| 2024/0028831 A1* | 1/2024 | Jain | | G06F 16/38 |
| 2024/0071598 A1* | 2/2024 | Neumann | | G16H 10/20 |
| 2024/0073012 A1* | 2/2024 | Neumann | | H04L 9/0861 |
| 2024/0078451 A1* | 3/2024 | Neumann | | G06N 3/09 |
| 2024/0095036 A1* | 3/2024 | Neumann | | G06Q 10/047 |
| 2024/0112562 A1* | 4/2024 | Sicconi | | G07C 5/085 |
| 2024/0126794 A1* | 4/2024 | Cook | | H04L 51/02 |
| 2024/0144192 A1 | 5/2024 | Weissenberger et al. | | |
| 2024/0164688 A1* | 5/2024 | Asirvatham | | G06N 3/088 |
| 2024/0170122 A1* | 5/2024 | Neumann | | G16H 10/20 |
| 2024/0170129 A1* | 5/2024 | Neumann | | G16H 50/70 |
| 2024/0177119 A1* | 5/2024 | Bhatia | | H04L 12/1818 |
| 2024/0194321 A1* | 6/2024 | Neumann | | G16H 50/20 |
| 2024/0194340 A1* | 6/2024 | Neumann | | G16H 20/00 |
| 2024/0212144 A1* | 6/2024 | Neumann | | G06N 20/00 |
| 2024/0221722 A1* | 7/2024 | Cheung | | G06F 3/167 |
| 2024/0249815 A1* | 7/2024 | Neumann | | G06N 20/00 |
| 2024/0249818 A1* | 7/2024 | Neumann | | G16H 50/20 |
| 2024/0265114 A1* | 8/2024 | Lambotte | | G06F 21/577 |
| 2024/0320823 A1* | 9/2024 | Shiralkar | | G06T 11/00 |
| 2024/0346029 A1* | 10/2024 | Neumann | | G06F 16/24575 |
| 2024/0354436 A1* | 10/2024 | Mukherjee | | G06F 16/3344 |
| 2024/0363247 A1* | 10/2024 | Attia | | G16H 50/30 |
| 2024/0379197 A1* | 11/2024 | Prems | | G16H 10/40 |
| 2024/0412128 A1* | 12/2024 | Rando | | G06Q 30/018 |
| 2024/0412720 A1* | 12/2024 | Vasylyev | | G06F 16/90332 |
| 2025/0045498 A1* | 2/2025 | Lee | | G06F 30/27 |
| 2025/0053273 A1* | 2/2025 | Uva | | G06Q 30/0282 |
| 2025/0053674 A1* | 2/2025 | Arriaga | | G06F 21/6218 |
| 2025/0054068 A1* | 2/2025 | Arriaga | | G06N 20/00 |
| 2025/0086594 A1* | 3/2025 | Adeli-Nadjafi | | G06N 20/00 |
| 2025/0088716 A1* | 3/2025 | Specter | | G06F 8/35 |
| 2025/0090905 A1* | 3/2025 | Jacobs, II | | A63B 24/0075 |
| 2025/0090933 A1* | 3/2025 | Jacobs, II | | G09B 5/06 |
| 2025/0095508 A1* | 3/2025 | Jacobs, II | | G06T 19/006 |
| 2025/0110943 A1* | 4/2025 | Miller | | G06N 3/0455 |
| 2025/0182219 A1* | 6/2025 | Lebwohl | | H04L 67/306 |

* cited by examiner

APPARATUS AND METHOD FOR TRAINING A MODEL TO DETECT TEMPORALLY STRUCTURED INFORMATION WITHIN AN UNSTRUCTURED DATASET

FIELD OF THE INVENTION

The present invention generally relates to the field of machine learning. In particular, the present invention is directed to an apparatus and a method for training a model to detect temporally structured information within an unstructured dataset.

BACKGROUND

The management of a candidate's availability for various engagements, such as interviews or meetings, is often a time-consuming and manual process, prone to human errors and inefficiencies. Current systems rely heavily on human intervention to interpret and schedule availability, leading to potential miscommunications and scheduling conflicts. Recent advancements in large language models (LLMs) offer an opportunity to automate this process by understanding and processing natural language inputs more accurately. By leveraging LLM technology to automatically manage and optimize a candidate's availability, scheduling various engagements may be done more seamlessly and efficiently.

SUMMARY OF THE DISCLOSURE

In an aspect, an apparatus for training a model to detect temporally structured information within an unstructured dataset includes at least a processor and a memory communicatively connected to the at least a processor. The memory contains instructions configuring the processor to generate, using a large language model, a first communication, wherein the first communication comprises a first query, transmit the first communication, using a first communication channel of a plurality of communication channels, receive a first response, wherein the first response comprises temporally structured information associated with the first communication, generate, using the large language model, a follow-up communication wherein generating the follow-up communication comprises identifying a temporal expression of the temporally structured information from the first response, determining a reference date, normalizing the temporal expression, and generating, as a function of identifying and normalizing the temporal expression, the follow-up communication, transmit the follow-up communication, using at least a communication channel of the plurality of communication channels, receive a follow-up response, wherein the follow-up response comprises temporally structured information associated with the follow-up communication, display, using a client device, the first communication and the follow-up communication.

In another aspect, a method for training a model to detect temporally structured information within an unstructured dataset includes generating, using a large language model, a first communication, wherein the first communication comprises a first query, transmitting the first communication, using a first communication channel of a plurality of communication channels, receiving a first response, wherein the first response comprises temporally structured information associated with the first communication, generating, using the large language model, a follow-up communication wherein generating the follow-up communication comprises identifying a temporal expression of the temporally structured information from the first response, determining a reference date, normalizing the temporal expression, and generating, as a function of identifying and normalizing the temporal expression, the follow-up communication, transmitting the follow-up communication, using at least a communication channel of the plurality of communication channels, receiving a follow-up response, wherein the follow-up response comprises temporally structured information associated with the follow-up communication, displaying, using a client device, the first communication and the follow-up communication. These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for training a model to detect temporally structured information within an unstructured dataset. The apparatus includes at least a computing device comprised of a processor and a memory communicatively connected to the processor. The memory instructs the processor to generate, using a large language model, a first communication, wherein the first communication comprises a first query. The processor transmits the first communication, using a first communication channel of a plurality of communication channels. The processor receives a first response, wherein the first response comprises temporally structured information associated with the first communication. The processor generates, using the large language model, a follow-up communication wherein generating the follow-up communication comprises identifying a temporal expression of the temporally structured information from the first response, determining a reference date, normalizing the temporal expression, and generating, as a function of identifying and normalizing the temporal expression, the follow-up communication. The processor transmits the follow-up communication, using at least a communication channel of the plurality of communication channels. The processor receives a follow-up response, wherein the follow-up response comprises temporally structured information associated with the follow-up communication. The processor displays, using a client device, the first communication and the follow-up communication.

Figure 1:
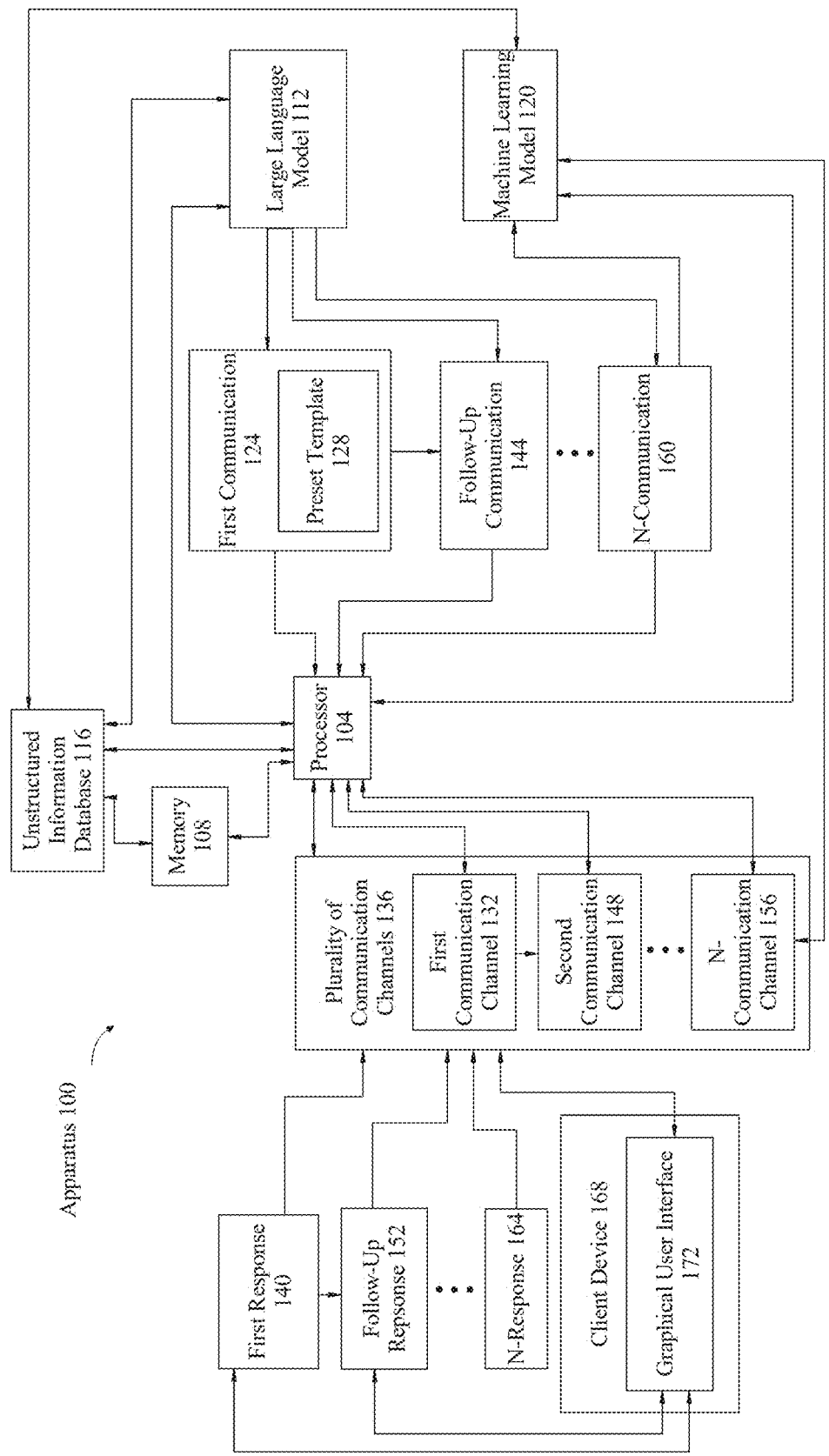
FIG. 1 is a block diagram of an apparatus for training a model to detect temporally structured information within an unstructured dataset.

Referring now to FIG. 1, an exemplary embodiment of apparatus 100 for training a model to detect temporally structured information within an unstructured dataset is illustrated. Apparatus 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 includes large language model 112. As used in this disclosure, "large language model" is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, candidate resumes, cover letters, referral letters, job postings, documents related to various industries (i.e., healthcare, engineering, finance, business, agriculture, and the like), digital text documents, images, graphs, video, audio recordings, emails, and the like. In some embodiments, training sets of an LLM may include information from one or more public or private databases. As a non-limiting example, training sets may include databases associated with a candidate. In some embodiments, training sets may include portions of documents associated with the responses to applicant inquiries of a job posting correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "You are the highest ranked candidate for this," then it may be highly likely that the word "position" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you," with "how" and "are." It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a candidate's availability.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, input data may be transformed into a numerical representation using text vectorization, embedding, or feature extraction, to allow LLM 112 and machine learning model 120 to process the data. In a nonlimiting example, input data may be transformed into numerical representations using vectors and/or matrices. A "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted ‖a‖ indicating the vector's length or size, and may be defined, as a non-limiting example, according to a Euclidean norm for an n-dimensional vector a as:

$$\|a\| = \sqrt{\sum_{i=0}^{n} a_i^2}$$

With continued reference to FIG. 1, as used in this disclosure "matrix" is a rectangular array or table of numbers, symbols, expressions, vectors, and/or representations arranged in rows and columns. For instance, and without limitation, matrix may include rows and/or columns comprised of vectors representing candidate's availability, where each row and/or column is a vector representing a distinct date; the date represented by vectors in matrix may include all of candidate's available days, months, years as described above as input using plurality of communication channels 136, including without limitation the specific time of day the candidate is available as described herein. As a non-limiting example matrix may include the exact day, month, year and time that the candidate is available.

Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix VT represents right singular vectors consisting of an orthogonal matrix of n rows and n columns according to the vectors consisting of an orthogonal matrix of n rows and n columns according to the function:

$$A_{mxn} = U_{mxm} S_{mxn} V_{nxn}^T$$

singular value decomposition function may find eigenvalues and eigenvectors of AAT and ATA. The eigenvectors of ATA may include the columns of VT, wherein the eigenvectors of AAT may include the columns of U. The singular values in S may be determined as a function of the square roots of eigenvalues AAT or ATA, wherein the singular values are the diagonal entries of the S matrix and are arranged in descending order. Singular value decomposition may be performed such that a generalized inverse of a non-full rank matrix may be generated.

With continued reference to FIG. 1, apparatus 100 may include unstructured information database 116, wherein unstructured information database 116 may contain a plurality of eligible candidates. As used in this disclosure, an "eligible candidate" is an individual who meets the minimum qualifications for a specific task and/or job. As used in this disclosure, an "unstructured information database" is a collection of temporally structured information. In a non-limiting example, the plurality of temporally structured information may be associated with a user's profile. In a non-limiting example, unstructured information database 116 may include a group of user's who are applying to a specific job posting. In a non-limiting example, unstructured information database 116 may include information related to the user's such as, without limitation, the user's resume, one or more referral letters, a cover letter, and the like. In a non-limiting example, unstructured information database 116 may be stored in memory 108 of apparatus 100. In another non-limiting embodiment, processor 104 may access unstructured information database 116.

With continued reference to FIG. 1 apparatus 100 may include machine learning model 120, wherein machine learning model 120 may include a neural network. As used in this disclosure, a "machine learning model" is a subset of artificial intelligence that focuses on building systems that learn or improve performance based on input data. Alternatively, or additionally, machine learning model 120 as described in FIG. 2 may include a neural network as detailed in FIG. 3 and FIG. 4. In an embodiment, specifically, temporally structured information may be extracted by utilizing deep neural networks, which may learn and identify complex patterns in the temporally structured information that may not be immediately apparent through traditional analysis methods.

With continued reference to FIG. 1, in a non-limiting example, machine learning model 120 may be the same or substantially the same as the machine learning model described in U.S. patent application Ser. No. 18/933,621, filed on Oct. 31, 2024, titled "APPARATUS AND METHOD FOR TRAINING A MACHINE LEARNING MODEL TO GENERATE A MATCH SCORE USING UNSTRUCTURED PROFILE DATA AND UNSTRUCTURED REFERENCE DATA," which is incorporated by reference herein in its entirety.

Still referring to FIG. 1, processor 104 generates, using large language model 112, first communication 124, wherein the first communication includes a first query. As used in this disclosure, a "first communication" is an initial digital contact with a user. In a non-limiting example, first communication 124 may be designed to obtain temporally structured information. In a non-limiting example, first communication 124 may include a question, comment, information, and the like. In another non-limiting example, first communication 124 may include a first query. As used in this disclosure, a "first query" is an initial question regarding temporally structured information. In a non-limiting example, a first query may ask the candidate, "Would you be available for a meeting with [company] on [date] at [time]?" or "Please provide your general weekday availability for the next 4 weeks." Without limitation, the first query may include relevant information about candidate's availability for in person meetings, phone calls, interviews, videochats, and the like.

With continued reference to FIG. 1, the first query of first communication 124 may include preset template 128. As used in this disclosure, a "preset template" is a digital document that provides a pre-defined format for users to fill in blanks and add information. In a non-limiting example, preset template 128 may include empty, fill in the blank, spaces for the user to populate with other data e.g., their availability for the day, week, month, year, and the like. In another non-limiting example, preset template 128 may accept text input, use drop down menus to allow the user to select a specific option or check boxes with various options of availability listed. In another non-limiting example, preset template 128 may include a list view or calendar view for the user to visually see their schedule and provide feedback on the time which they are available. Alternatively, or additionally, LLM 112 may populate preset template 128 using information acquired from the user. Continuing the previous, non-limiting example, LLM 112 may use first response 140 and or follow-up response 152, as described in more detail below, from the user to automatically populate preset template 128 with the temporally structured information. In a non-limiting example, temporally structured information may include the candidate's availability. In a non-limiting example, preset template 128 may be stored and reused for a plurality of candidates, in unstructured information database 116, as described herein.

With continued reference to FIG. 1, preset template 128 may be populated with a plurality of temporally structured information. As used in this disclosure, "temporally structured information" is data that includes a time component. In a non-limiting example, temporally structured information may be structured or unstructured, depending on its format and organization. In a non-limiting example, temporally structured information may include a text from the user saying, "I am available for an interview next weekend at 6-7 pm." In another non-limiting example, temporally structured information may include an email from a user defining their work schedule and times they will not be available for a meeting. In a non-limiting embodiment, temporally structured information may include a candidate's availability. As used in this disclosure, "candidate's availability" refers to the times, dates, and duration an applicant for a job is unoccupied and willing to engage with the recruiter, organization, or company seeking an applicant. In a non-limited example, candidate's availability may include ever Wednesday from 5-8 pm EST. In another non-limited example, candidate's availability may include Monday-Friday from 8 am-10 am EST to meet electronically, for example without limitation, through a video call, audio call, or the like, and Saturday 9-12 pm EST to meet in person at the company's office or another location. In a non-limited embodiment, candidate's availability may be transmitted to apparatus 100 using preset template 128 where the candidate is able to define the boundaries of their availability each day, week, month, year, and the like. In a non-limiting example, candidate's availability may be transmitted to apparatus 100 using plurality of communication channels 136 as discussed in more detail below.

Still referring to FIG. 1, processor 104 is configured to transmit first communication 124, using first communication channel 132 of plurality of communication channels 136. As used in this disclosure, a "communication channel" refers to a physical transmission of information through a medium. In a non-limiting example, the medium may include a wire or a logical connection over a multiplexed medium such as a radio channel in telecommunications and computer networking. For example, without limitation, plurality of communication channels 136 may include digital and nondigital methods, such as email, short message service (SMS), instant messaging (IM), voice-over-IP (VOIP), videochats, in person chats, audio recordings, phone calls, written letters, website chatbots, and the like. In a non-limiting example, plurality of communication channels 136 may include the transfer of information or questions related to the temporally structured information to the user from apparatus 100 and/or from the user to apparatus 100. As used in this disclosure, a "first communication channel" is an initial method of transferring information between two parties. In a non-limiting disclosure, first communication channel 132 may include any one of the aforementioned communication channels of plurality of communication channels 136, such as SMS or email. In a non-limiting example, processor 104 may receive the selection of first communication channel 132 from a user. Without limitation, and continuing the previous example, the user may define the communication channel using user preferences. In another non-limiting example, first communication channel 132 may be determined based on default settings. Without limitation, first communication channel 132 may be determined based on a conditional selection mechanism implemented by processor 104 where if specific conditions are present and/or satisfied, such as the urgency of a message, the communication history with a specific user, and/or the availability of information to make contact to the user through a specific medium. Continuing the previous example, this May include, without limitation, using SMS for first communication channel 132 in a scenario where a timely delivery of the message is required.

Still referring to FIG. 1, processor 104 is configured to receive first response 140, wherein first response 140 includes temporally structured information associated with first communication 124. As used in this disclosure, a "first response" is any information initially provided by the user to apparatus 100 related to first communication 124. Without limitation, first response 140 may include temporally structured information. In a non-limiting example, first response 140 may include information that answer's the first query of first communication 124, for example, first response 140 may include information related to candidate's availability for the week to take a formal interview with a hiring manager at a company, recruiter, and the like. In another non-limiting example, first response 140 may be transmitted to apparatus 100 using any communication channel described herein. In a non-limiting example, the candidate may transmit first response 140 using first communication channel 132, wherein first communication channel is used to transmit first communication 124, or a different communication channel of plurality of communication channels 136 to provide apparatus 100 with first response 140. Additionally, without limitation, first response 140 may include any medium, such as, text input, audio input, image input, filling out preset template 128, and any combinations thereof. In another non-limiting example, the candidate may provide, via text message, the following first response 140, "I am available to meet in-person next week on Wednesday anytime after 6 pm." In a non-limiting example LLM 112 receives first response 140 and may generate a set of options for the candidate to choose a preferred time, for example, without limitation, "6-6:30 pm EST Wednesday, May 29, 2024, at the [company's] office, [address]," "7:30-8 pm EST Wednesday, May 29, 2024, in the lobby of [building name], [address]" or "7-8 pm EST Wednesday, May 29, 2024, at [a local cafe], [address]," and the like. In one or more embodiment, first response 140 may include no response from the candidate within a certain time frame, such as, without limitation, no response from the candidate after the candidate received first communication 124 three months prior. In another non-limiting example, first response 140 may include a bounce-back message from first communication channel 132, as discussed in more detail below.

Still referring to FIG. 1, processor 104 generates, using large language model 112, follow-up communication 144 wherein generating follow-up communication 144 comprises identifying a temporal expression of the temporally structured information from first response 140, determining a reference date, normalizing the temporal expression, and generating, as a function of identifying and normalizing the temporal expression, follow-up communication 144. As used in this disclosure, a "follow-up communication" is a subsequent digital contact with a user. In a non-limiting example, follow-up communication 144 may include a question, comment, information, and the like. In a non-limiting example, follow-up communication 144 may be designed to follow-up on the temporally structured information, such as, the candidate's availability. In another non-limiting example, follow-up communication 144 may include a second query. As used in this disclosure, a "second query" is a subsequent question or questions associated with prior communications. In a non-limiting example, a second query may ask the candidate to provide clarity on their availability or additional information regarding their availability, such as, without limitation, "Do you have a preference to have the meeting in-person, over a videocall, or audio call for the interview next week with [company] on [date] at [time]?" or "Can you please clarify which day you are available from 2-3 pm?" Without limitation, this second query gathers information about candidate's availability for in person meetings, phone calls, interviews, videochats, and the like. As used in this disclosure, a "temporal expression" is a term or phrase used to denote a specific point in time. In a non-limiting example, temporal expression may include a timestamp, such as, a day of the week, a specific calendar date, a time, and the like. In another non-limiting example, the temporal expression may include phrases that denote specific points in time, time intervals, or recurring time patterns, and the like. For example, without limitation, temporal expression may be conveyed using the following terms, "Jan. 1, 2022," "10:30 AM," "from 3 PM to 5 PM," "every Monday," "annually," "monthly," "yesterday," "next week," "two days ago," and the like. As used in this disclosure, a "reference date" is a specific date used as a point of comparison or basis for calculating other dates and/or periods of time. For example, without limiting the reference date in a communication from a user saying, "Schedule the meeting a week from tomorrow" may be "tomorrow." In another non-limiting example, the reference date in first response 140 from the user may be today's date, where first response 140 says, "I am available for a call in 2 weeks." As used in this disclosure, normalizing the temporal expression involves converting various natural language expressions of time into a standard, consistent format. In a non-limiting example, this process ensures that different ways of expressing time are understood uniformly, facilitating accurate interpretation, comparison, and processing. In another non-limiting example, normalizing the temporal expressions is especially important for natural language processing, database management, and software development. Without limitation, normalizing a response from a user, such as, "next Monday," or "three days ago" may include converting the phrase into a standard date format, such as "YYYY-MM-DD." In another non-limiting example, normalizing the temporal expression may include adjusting times to common time zones, in particular, when apparatus is dealing with global databases and users from around the world. Continuing the previous non-limiting example, the phrase "next Monday" may be normalized to "2024-06-10" if today's date is "2024-06-03."

Still referring to FIG. 1, processor 104 transmits follow-up communication 144, using at least a communication channel of plurality of communication channels 136. In a non-limiting example, processor 104 may use the same communication channel of plurality of communication channels 136 as first response 140 and/or first communication 124 to transmit follow-up communication 144. For example, if first communication 124 is transmitted using first communication channel 132 and the candidate replies to first communication 124 with first response 140 using second communication channel 148 apparatus 100 may use either first communication channel 132 or second communication channel 148 or both to transmit follow-up communication 144. As used in this disclosure, a "second communication channel" is a subsequent method of transferring information between two entities. In a non-limiting disclosure, second communication channel 148 may include any one of the aforementioned communication channels of plurality of communication channels 136, such as SMS or email.

Still referring to FIG. 1, processor 104 receives follow-up response 152, wherein follow-up response 152 includes temporally structured information associated with follow-up communication 144. As used in this disclosure, a "follow-up response" is any information subsequently provided by the user associated with a prior communication. In a non-limiting example, follow-up response 152 may include information that answer's the second query of follow-up communication 144, for example, follow-up response 152 may include additional, follow-up information related to the temporally structured information, for example, candidate's availability for the day to take a formal interview with a hiring manager, a recruiter, and the like. In another non-limiting example, follow-up response 152 may be transmitted to apparatus 100 using any communication channel described herein. In a non-limiting example, the candidate may transmit follow-up response 152 using first communication channel 132, wherein first communication channel is used to transmit first communication 124, or a different communication channel of plurality of communication channels 136 to provide apparatus 100 with follow-up response 152. Additionally, without limitation, follow-up response 152 may include any medium, such as, text input, audio input, image input, filling out preset template 128, and the like. In another non-limiting example, the candidate may provide, via text message, the following follow-up response 152, "I am no longer available to meet in-person today. Please cancel my 6 pm meeting," or "I need to reschedule my meeting next week with [company] for the following week, same time and day of the week works for me." In a non-limiting example LLM 112 receives follow-up response 152 and may generate a set of options for the candidate to choose a preferred reschedule time, for example, without limitation, "6-6:30 pm EST Wednesday, May 29, 2024, at the [company's] office, [address]," 7:30-8 pm EST Wednesday, May 29, 2024, in the lobby of [building name], [address]" or "7-8 pm EST Wednesday, May 29, 2024, at [a local cafe], [address]," and the like. In one or more embodiment, follow-up response 152 may include no response from the candidate within a certain time frame, such as, without limitation, no response from the candidate after the candidate received follow-up communication 144 three months prior. In another non-limiting example, follow-up response 152 may include a bounce-back message from at least a communication channel, as discussed in more detail below.

With continued reference to FIG. 1, LLM 112 may be trained using an unstructured information database 116, first response 140, and follow-up response 152. As used in this disclosure, an "unstructured information database" is a database containing a plurality of unstructured data. In a non-limiting embodiment, unstructured information database may include profile data, communication data such as historical communications made between the user and the system, first communication 124, first response 140, follow-up communication 144, follow-up response 152, and the like. In a non-limiting embodiment, LLM 112 may use unstructured information database 116 to understand the user's goals and give context to the temporal data received from first response 140, follow-up response 152, and n-responses 164 as discussed more below.

With continued reference to FIG. 1 wherein machine learning model 120 may be configured to identify a user status. As used in this disclosure, a "user status" is a categorization of an individual or group based on their relationship to the system. In a non-limiting example, a user status may include active, prospective, former, lapsed, and the like. For example, machine learning model 120 may categorize an individual user as active, where the user is responsive to apparatus 100 and provides temporally structured information. In another non-limiting example, machine learning model 120 may categorize a user as nonresponsive, or former, and flag the specific user for removal from unstructured information database 116. Without limitation, machine learning model 120 may be trained using training data as discussed herein. For example, without limitation, machine learning model 120 training data may include a plurality of labeled unstructured information. As used in this disclosure, a "nonresponsive user" is a n individual who does not provide a response to the apparatus. In a non-limiting embodiment, a nonresponsive user may be a candidate who does not respond to a communication, transmitted by apparatus 100, within a specified time frame from the receipt of the communication. In a non-limiting example, processor 104 may be configured to monitor an unresponsive user for 30 days, using a trusted server-side rimer, and compare the user response to a predetermined time threshold, for example, without limitation, 60 days or 90 days, or the like. Without limitation, other specified time frame may be 10 days, 1 year, until the expiration of the requested meeting of a communication sent by apparatus 100, and the like. In a nonlimiting example, machine learning model 120 may identify the nonresponsive users and flag their profiles for removal from unstructured information database 116.

With continued reference to FIG. 1, processor 104 may be configured to remove the nonresponsive user from unstructured information database 116. As used in this disclosure, a "nonresponsive user profile" is a collection of information associated with a nonresponsive user. Without limitation, processor 104 may store nonresponsive user profiles in a separate database for future matching to opportunities when the candidate becomes available again, such as, without limitation, in two years if the nonresponsive user becomes reclassified, by the machine learning model, as available because, for example, the user is looking for a new job. For example, without limitation, the nonresponsive user profile may contain historical information associated with a nonresponsive user, such as previous chat history related to the user's schedule and availability. In a non-limiting example, a nonresponsive user profile may be transferred, using processor 104, back into the unstructured information database 116 if and when the machine learning model reclassifies the user status as active and/or responsive. For example, without limitation, a nonresponsive user profile may later be restored to unstructured information database 116 if the user reaches out to apparatus 100 and/or the machine learning model identifies the user status as available. In a non-limiting embodiment, apparatus 100 may attempt to reach the candidate using up to n-communication channels of plurality of communication channels 136. Additionally, or alternatively, apparatus 100 may include n-communication and n-responses. As used in this disclosure, "n-responses" is a subsequent response by a user, where "n" represents an integer that specifies a number of responses. As used in this disclosure, a "n-communication channel" is a subsequent method of transferring information between two parties, where "n" represents an integer that specifies a number of communication channel's used to transmit information. In a non-limiting disclosure, n-communication channel 156 may include any one of the aforementioned communication channels of plurality of communication channels 136, such as SMS or email. In a non-limiting example, machine learning model 120 may receive notice when n-communication channel 156 has been used to identify the nonresponsive user and remove the nonresponsive user from unstructured information database 116. For example, without limitation, apparatus 100 may attempt to reach the candidate via first communication channel 132 through text message, then using second communication channel 148 through email, then using n-communication channel 156 using an audio recording. In a non-limiting embodiment, the candidate may not respond to any of the aforementioned attempts and thereby be categorized, using machine learning model 120, as a nonresponsive user and removed from unstructured information database 116. In a nonlimited example, n-communication channel 156 may be used to transmit n-communication 160. As used in this disclosure, an "n-communication" is a subsequent digital contact with a user, where "n" represents an integer that specifies a number of times contact was attempted. In a non-limiting example, n-communication 160 may be designed to follow-up on the candidate's availability and/or inquire with the candidate if they are still available. In a non-limiting example, n-communication 160 may include a question, comment, information, and the like. In another non-limiting example, n-communication 160 may include a third inquiry. As used in this disclosure, a "third inquiry" is a follow-up, tertiary question or questions regarding. In a non-limiting example, a third inquiry may ask the candidate to provide clarity on their availability or additional information regarding their availability, such as, without limitation, "Are you available or would you like to be removed from the database?" and "This is our final attempt to reach you. Please let us know if you are available."

With continued reference to FIG. 1 wherein apparatus 100 is configured to transmit a communication using second communication channel 148 if apparatus 100 receives a bounce-back message. As used in this disclosure, a "bounce-back message" is an automated response to inform the sender that their message has not been delivered to the intended recipient. In a non-limited example, the bounce-back message may be transmitted from the communication channel corresponding to the communication sent from apparatus 100. For example, without limitation, if apparatus 100 may transmit first communication 124 to the candidate using first communication channel 132, such as, without limitation, through email, and a bounce-back message containing an error message (and in some cases, one or more corresponding error codes) may be sent back to apparatus 100 saying, "Delivery to the following recipient failed. The recipient's domain does not exist," apparatus 100 may then transmit follow-up communication 144 using second communication channel 148.

Still referring to FIG. 1, processor 104 display, using client device 168, first communication 124 and follow-up communication 144. As used in this disclosure, a "client device" is a computing device operated by a user. For instance, and without limitation, client device may include a remote device, a display device, and/or apparatus 100. In a non-limiting embodiment, client device may be consistent with a computing device as described in the entirety of this disclosure. In a non-limiting example, client device 168 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user interface (GUI) to a user, wherein a user may interact with a GUI. In some cases, a user may view a GUI through display. Additionally, or alternatively, processor 104 be connected to display device. In one or more embodiments, transmitting first communication 124 and follow-up communication 144 may include displaying first communication 124 and follow-up communication 144 at display device using a visual interface.

With continued reference to FIG. 1 the apparatus further includes graphical user interface 172, wherein the graphical user interface includes a data structure. A "graphical user interface," as used herein, is a graphical form of user interface that allows users to interact with electronic devices. In some embodiments, graphical user interface 172 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, as used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 104, wherein elements within graphical user interface 172 may be modified as a result. In some cases, processor 104 may be configured to transmit display device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 104 may transmit the data described above to a database wherein the data may be accessed from the database. Processor 104 may further transmit the data above to a display device, client device 168, or another computing device.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
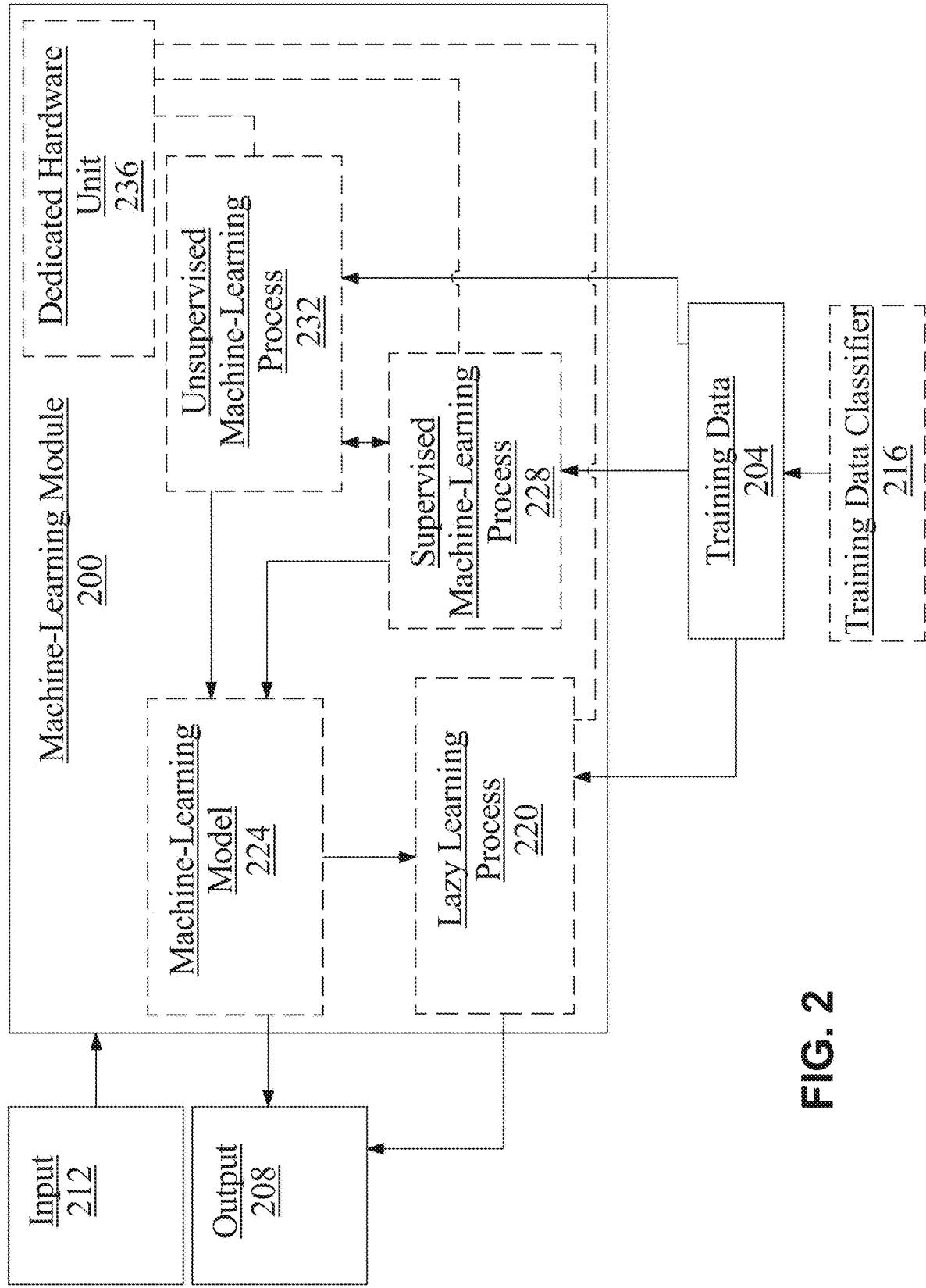
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example inputs may include first response, second response, first communication, second communication, candidate database and the like; outputs may include identifying nonresponsive users and removing nonresponsive users from unstructured information database 116.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to responsive and nonresponsive users.

Still referring to FIG. 2, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm May include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include candidate responses as described above as inputs, identifying and classifying responsive and nonresponsive users as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
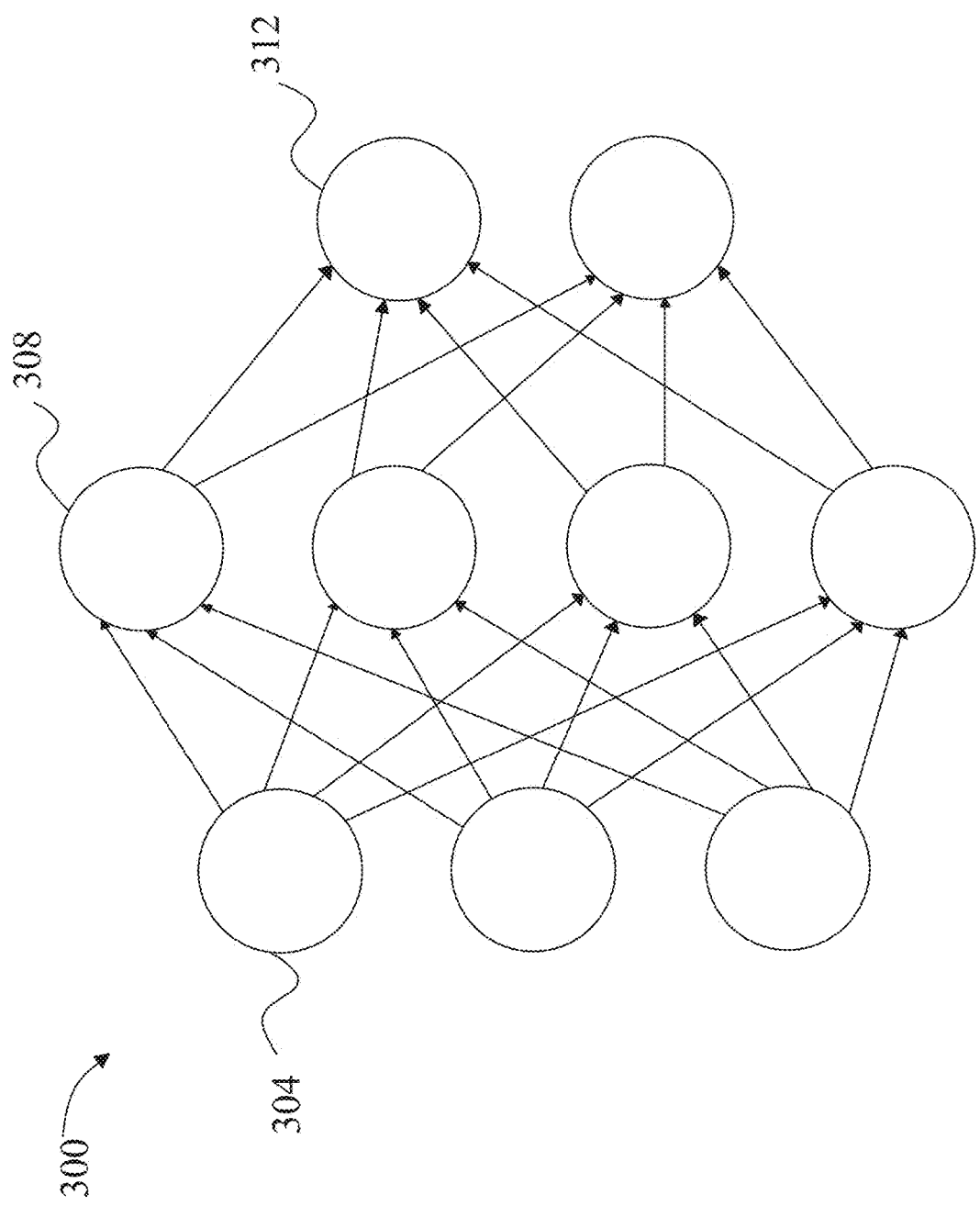
FIG. 3 is a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
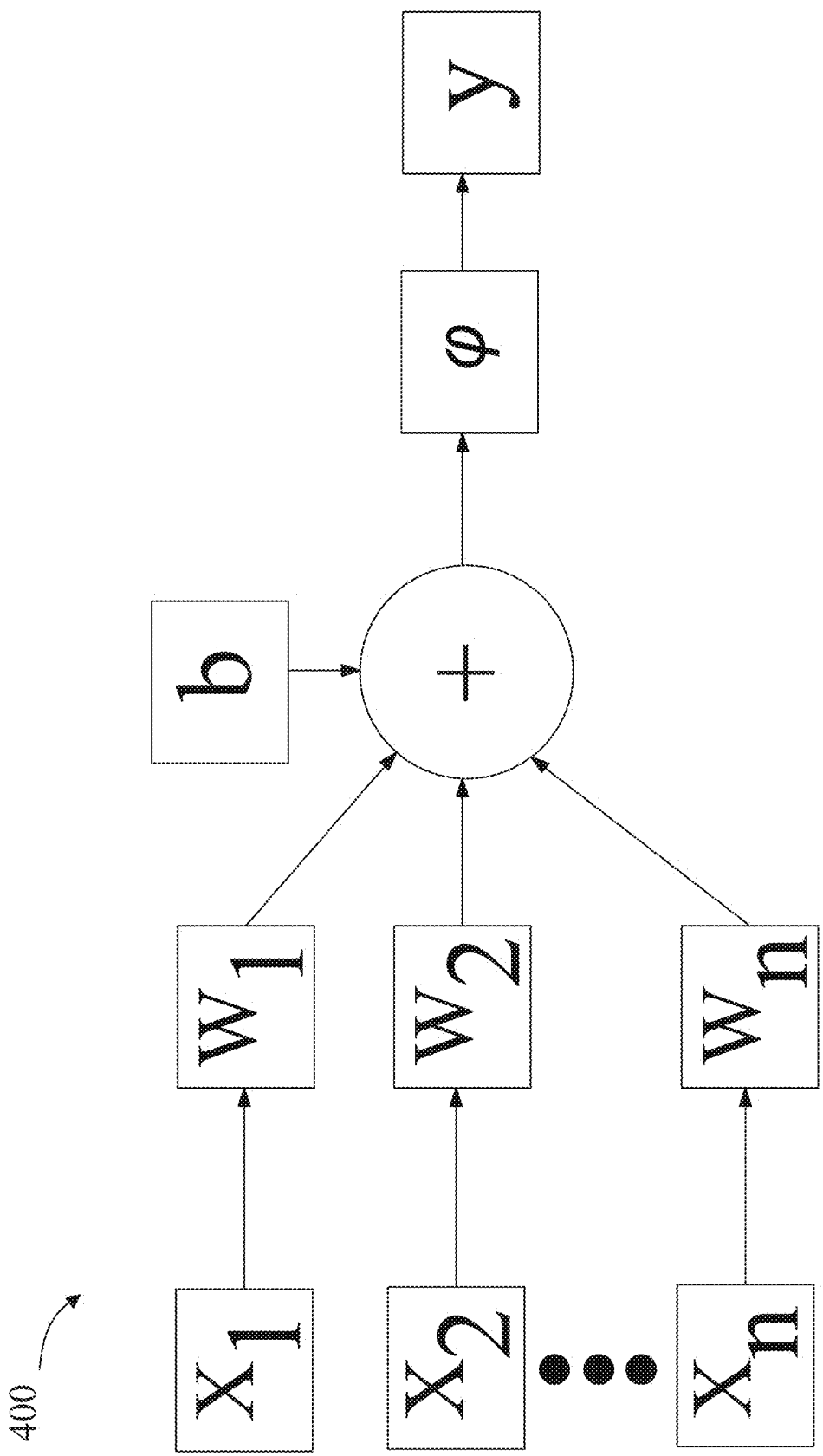
FIG. 4 is a diagram of an exemplary embodiment of a node of a neural network.

Referring now to FIG. 4, an exemplary embodiment of a node 400 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tan h derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
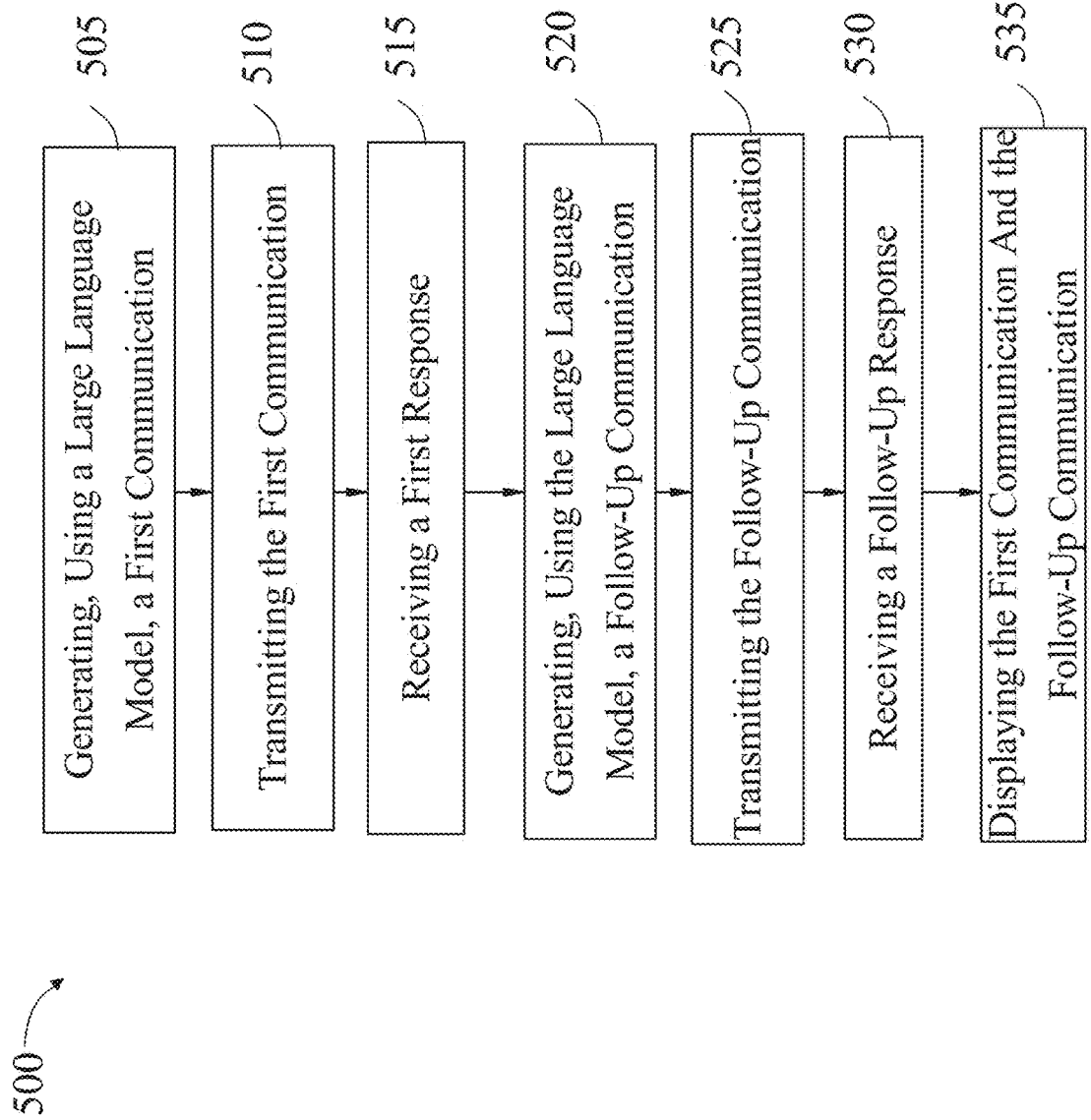
FIG. 5 is a block diagram of an exemplary method for training a model to detect temporally structured information within an unstructured dataset.

Referring now to FIG. 5, a flow diagram of an exemplary method 500 for training a model to detect temporally structured information within an unstructured dataset is illustrated. At step 505, method 500 includes generating, using a large language model, a first communication, wherein the first communication comprises a first query. This may be implemented as described and with reference to FIGS. 1-4.

Still referring to FIG. 5, at step 510, method 500 includes transmitting the first communication, using a first communication channel of a plurality of communication channels. This may be implemented as described and with reference to FIGS. 1-4.

Still referring to FIG. 5, at step 515, method 500 includes receiving a first response, wherein the first response comprises temporally structured information associated with the first communication. This may be implemented as described and with reference to FIGS. 1-4.

Still referring to FIG. 5, at step 520, method 500 includes generating, using the large language model, a follow-up communication wherein generating the follow-up communication comprises identifying a temporal expression of the temporally structured information from the first response, determining a reference date, normalizing the temporal expression, and generating, as a function of identifying and normalizing the temporal expression, the follow-up communication. This may be implemented as described and with reference to FIGS. 1-4.

Still referring to FIG. 5, at step 525, method 500 includes transmitting the follow-up communication, using at least a communication channel of the plurality of communication channels. This may be implemented as described and with reference to FIGS. 1-4.

Still referring to FIG. 5, at step 530, method 500 includes receiving a follow-up response, wherein the follow-up response comprises temporally structured information associated with the follow-up communication. This may be implemented as described and with reference to FIGS. 1-4.

Still referring to FIG. 5, at step 535, method 500 includes displaying, using a client device, the first communication and the follow-up communication. This may be implemented as described and with reference to FIGS. 1-4. In an embodiment, wherein displaying the first communication and the follow-up communication using a display device may include a remote device, the apparatus, and or shared devices.

Figure 6:
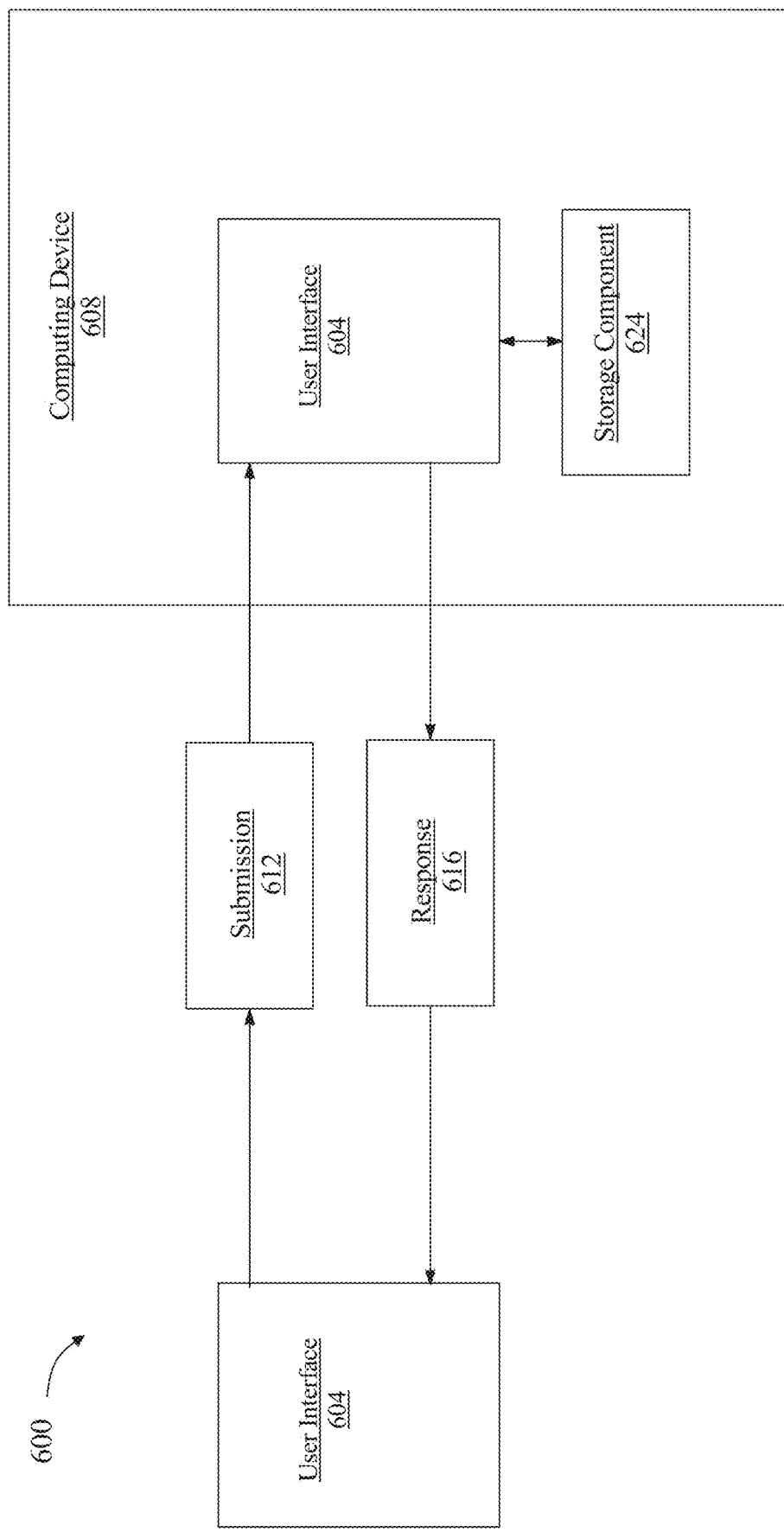
FIG. 6 is a diagram of an exemplary embodiment of a chatbot.

Referring to FIG. 6, a chatbot system 600 is schematically illustrated. According to some embodiments, a user interface 604 may be communicative with a computing device 608 that is configured to operate a chatbot. In some cases, user interface 604 may be local to computing device 608. Alternatively or additionally, in some cases, user interface 604 may remote to computing device 608 and communicative with the computing device 608, by way of one or more networks, such as without limitation the internet. Alternatively or additionally, user interface 604 may communicate with user device using telephonic devices and networks, such as without limitation fax machines, short message service (SMS), or multimedia message service (MMS). Commonly, user interface 604 communicates with computing device 608 using text-based communication, for example without limitation using a character encoding protocol, such as American Standard for Information Interchange (ASCII). Typically, a user interface 604 conversationally interfaces a chatbot, by way of at least a submission 612, from the user interface 604 to the chatbot, and a response 616, from the chatbot to the user interface 604. In many cases, one or both of submission 612 and response 616 are text-based communication. Alternatively or additionally, in some cases, one or both of submission 612 and response 616 are audio-based communication.

Continuing in reference to FIG. 6, a submission 612 once received by computing device 608 operating a chatbot, may be processed by a processor 620. In some embodiments, processor 620 processes a submission 612 using one or more of keyword recognition, pattern matching, and natural language processing. In some embodiments, processor employs real-time learning with evolutionary algorithms. In some cases, processor 620 may retrieve a pre-prepared response from at least a storage component 624, based upon submission 612. Alternatively or additionally, in some embodiments, processor 620 communicates a response 616 without first receiving a submission 612, thereby initiating conversation. In some cases, processor 620 communicates an inquiry to user interface 604; and the processor is configured to process an answer to the inquiry in a following submission 612 from the user interface 604. In some cases, an answer to an inquiry present within a submission 612 from a user device may be used by a computing device as an input to another function, for example without limitation first response 140 and the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
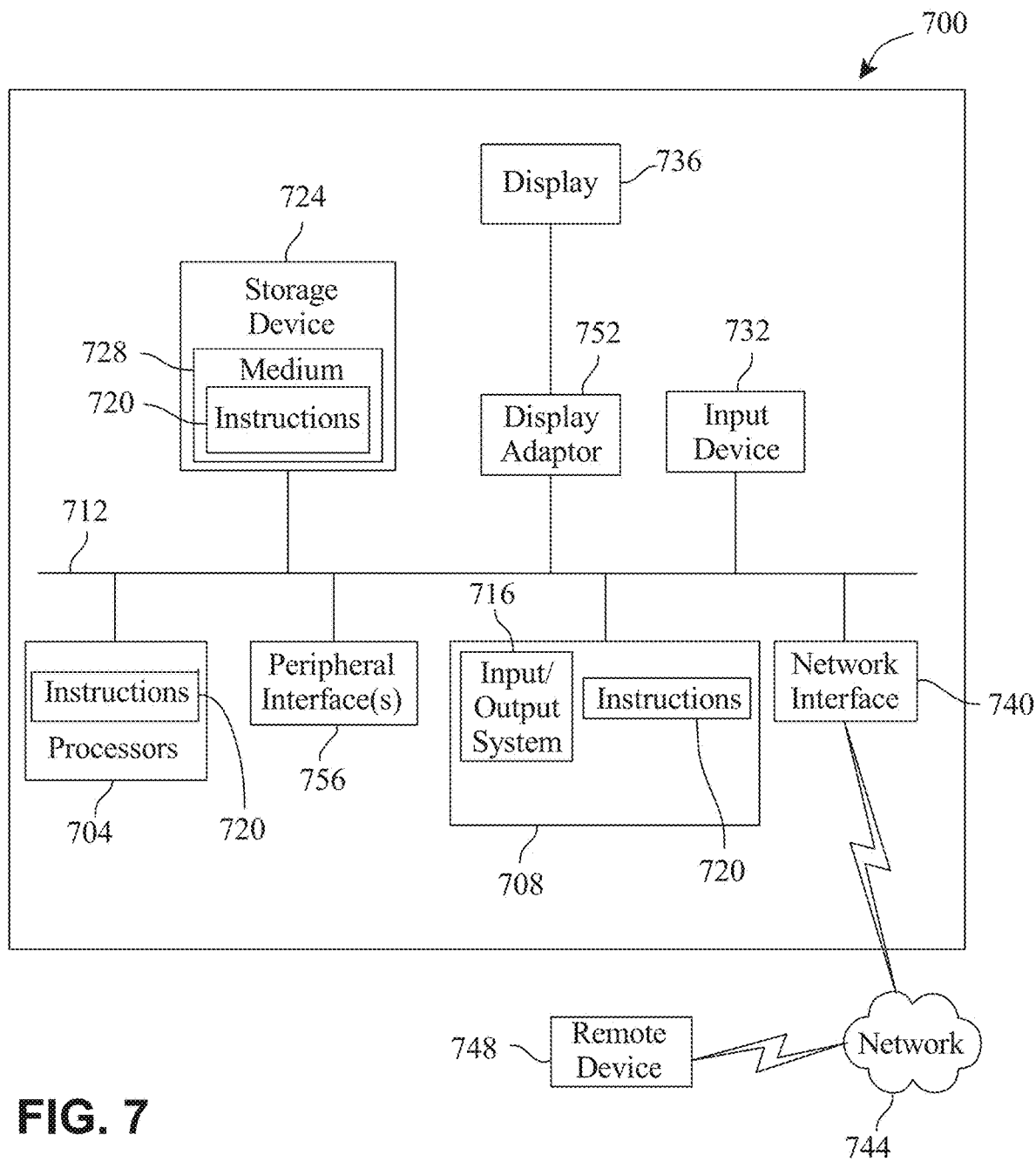
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. An apparatus for training a model to detect temporally structured information within an unstructured dataset, wherein the apparatus comprises:
    at least a computing device, wherein the computing device comprises:
        a memory; and
        at least a processor communicatively connected to the memory, wherein the memory contains instructions configuring the at least a processor to:
            generate, using a large language model, a first communication, wherein the first communication comprises a first query which further comprises:
                receiving a training dataset, wherein the training dataset correlates an unstructured information database to a plurality of candidate data;
                training, iteratively, the large language model using the sanitized training dataset; and
                generating the first communication using the trained large language model;
            transmit the first communication, using a first communication channel of a plurality of communication channels;
            receive a first response, wherein the first response comprises temporally structured information associated with the first communication;
            identify, using a machine learning model, a user status, wherein the machine learning model is configured to classify the user status into an activity grouping, wherein the activity grouping comprises one or more of an active status and an unresponsive status, wherein the unresponsive status prompts the at least a processor to remove an unresponsive user profile from the unstructured information database,
            store, using the at least a processor, the unresponsive user profile in a separate database, wherein the machine learning model iteratively re-classifies the unresponsive user profile to verify the user status;
            generate, using the large language model, a follow-up communication, wherein the follow-up communication comprises a question configured to further clarify the temporally structured information associated with the first communication, and wherein generating the follow-up communication comprises:
                identifying a temporal expression of the temporally structured information from the first response;
                determining a reference date;
                normalizing the temporal expression; and
                generating, as a function of identifying and normalizing the temporal expression, the follow-up communication;
            transmit the follow-up communication, using at least a communication channel of the plurality of communication channels;
            receive a follow-up response, wherein the follow-up response comprises temporally structured information associated with the follow-up communication; and
            display, using a client device, the first communication and the follow-up communication.

2. The apparatus of claim 1, wherein the first query of the first communication comprises a preset template.

3. The apparatus of claim 2, wherein the preset template is populated with a plurality of temporally structured information.

4. The apparatus of claim 1, wherein the large language model is trained using an unstructured information database, the first response, and the follow-up response.

5. The apparatus of claim 1, wherein the unstructured information database comprises a plurality of temporally structured information.

6. The apparatus of claim 1, wherein the apparatus comprises a machine learning model, wherein the machine learning model comprises a neural network.

7. The apparatus of claim 6, wherein the machine learning model is configured to identify a user status.

8. The apparatus of claim 7, wherein the machine learning model is trained using the unstructured information database and a plurality of responses.

9. The apparatus of claim 1, wherein the memory further contains instructions configuring the at least a processor to:
    transmit the follow-up communication using a second communication channel of the plurality of communication channels upon receiving a bounce-back message from the first communication channel.

10. The apparatus of claim 1, further comprises n-communication and n-responses.

11. The method for detect temporally structured information within an unstructured dataset, wherein the method comprises:
    generating, using a large language model, a first communication, wherein the first communication comprises a first query which further comprises:
        receiving a training dataset, wherein the training dataset correlates an unstructured information database to a plurality of candidate data;
        training, iteratively, the large language model using the training dataset; and
        generating the first communication using the trained large language model;
    transmitting the first communication, using a first communication channel of a plurality of communication channels;

receiving a first response, wherein the first response comprises temporally structured information associated with the first communication;

identifying, using a machine learning model, a user status, wherein the machine learning model is configured to classify the user status into an activity grouping, wherein the activity grouping comprises one or more of an active status and an unresponsive status, wherein the unresponsive status prompts the at least a processor to remove an unresponsive user profile from the unstructured information database, storing, using the at least a processor, the unresponsive user profile in a separate database, wherein the machine learning model iteratively re-classifies the unresponsive user profile to verify the user status;

generating, using the large language model, a follow-up communication, wherein the follow-up communication comprises a question configured to further clarify the temporally structured information associated with the first communication, and wherein generating the follow-up communication comprises:
- identifying a temporal expression of the temporally structured information from the first response;
- determining a reference date;
- normalizing the temporal expression; and
- generating, as a function of identifying and normalizing the temporal expression, the follow-up communication;

transmitting the follow-up communication, using at least a communication channel of the plurality of communication channels;

receiving a follow-up response, wherein the follow-up response comprises temporally structured information associated with the follow-up communication; and displaying, using a client device, the first communication and the follow-up communication.

12. The method of claim 11, wherein the first query of the first communication comprises a preset template.

13. The method of claim 12, wherein the preset template is populated with a plurality of temporally structured information.

14. The method of claim 11, wherein the large language model is trained using an unstructured information database, the first response, and the follow-up response.

15. The method of claim 11, wherein the unstructured information database comprises a plurality of temporally structured information.

16. The method of claim 11, wherein the apparatus comprises a machine learning model, wherein the machine learning model comprises a neural network.

17. The method of claim 16, wherein the machine learning model is configured to identify a user status.

18. The method of claim 17, wherein the machine learning model is trained using the unstructured information database and a plurality of responses.

19. The method of claim 11, wherein the memory further contains instructions configuring the at least a processor to:
transmit the follow-up communication using a second communication channel of the plurality of communication channels upon receiving a bounce-back message from the first communication channel.

20. The method of claim 11, further comprises n-communication and n-responses.

* * * * *